(12) United States Patent
Lehmann et al.

(10) Patent No.: US 8,271,154 B2
(45) Date of Patent: Sep. 18, 2012

(54) METHOD FOR CONTROLLING A HYBRID DRIVE IN A RAIL VEHICLE

(75) Inventors: Ingo Lehmann, Owingen (DE); Holger Bottlang, Radolfzell (DE)

(73) Assignee: MTU Friedrichshafen GmbH, Friedrichshafen (DE)

(*) Notice: Subject to any disclaimer, the term of this patent is extended or adjusted under 35 U.S.C. 154(b) by 0 days.

(21) Appl. No.: 13/058,940

(22) PCT Filed: Jul. 28, 2009

(86) PCT No.: PCT/EP2009/005450
§ 371 (c)(1),
(2), (4) Date: Mar. 28, 2011

(87) PCT Pub. No.: WO2010/017887
PCT Pub. Date: Feb. 18, 2010

(65) Prior Publication Data
US 2011/0178659 A1 Jul. 21, 2011

(30) Foreign Application Priority Data

Aug. 12, 2008 (DE) .......................... 10 2008 038 753

(51) Int. Cl.
*G05D 1/00* (2006.01)

(52) U.S. Cl. ................. 701/19; 701/21; 701/22; 701/51; 701/59; 701/123; 701/408; 903/902; 290/40 A; 180/65.28; 180/65.265; 180/65.21

(58) Field of Classification Search ................... 701/19, 701/20, 117, 21, 22, 51, 59, 123, 408; 180/65.21, 180/65.28, 65.265; 903/902
See application file for complete search history.

(56) References Cited

U.S. PATENT DOCUMENTS

| | | | | |
|---|---|---|---|---|
| 6,665,609 B1* | 12/2003 | Franke et al. | .................. | 701/99 |
| 6,668,217 B1* | 12/2003 | Franke et al. | .................. | 701/19 |
| 2008/0077285 A1* | 3/2008 | Kumar et al. | .................. | 701/19 |
| 2008/0125924 A1* | 5/2008 | Daum et al. | .................... | 701/19 |

FOREIGN PATENT DOCUMENTS

| | | |
|---|---|---|
| DE | 129761 A1 | 2/1978 |
| DE | 19935349 A1 | 2/2001 |
| DE | 19935352 A1 | 2/2001 |
| EP | 1466803 A1 | 10/2004 |

* cited by examiner

*Primary Examiner* — Redhwan K Mawari
(74) *Attorney, Agent, or Firm* — Rader, Fishman & Grauer, PLLC

(57) ABSTRACT

A method is proposed for controlling a hybrid drive in a rail vehicle in which an electronic route timetable (SPL) is predefined as route-section-related speeds by means of a train control device, route-section-related types of drive for the rail vehicle are predictively determined by means of the electronic route timetable (SPL) before the journey begins, a deviation of the actual position from a setpoint position of the rail vehicle which is obtained from the electronic route timetable (SPL) is determined while the rail vehicle is travelling, a time margin is calculated on the basis of the difference in position, and the current type of drive is retained or changed as a function of the time margin.

6 Claims, 3 Drawing Sheets

METHOD FOR CONTROLLING A HYBRID DRIVE IN A RAIL VEHICLE

CROSS-REFERENCES TO RELATED APPLICATION

This application claims priority to German patent application DE 10 2008 038 753.3 filed on Aug. 12, 2008 and PCT application PCT/EP2009/005450 filed on Jul. 28, 2009, which are hereby incorporated by reference in their entireties.

TECHNICAL FIELD

The present invention relates to a method for controlling a hybrid drive in a rail vehicle in which an electronic route timetable is predefined in form of route-section-related speeds by means of train control device.

BACKGROUND

In a well-known method from DE 102 26 143 B4 for controlling a hybrid drive, the type of drive is proposed taking vehicle operation into consideration. The proposed vehicle operation strategy is regarded as being fulfilled, if the driver does not interfere with the system. If, however, the driver operates the accelerator or the brake pedal, this rules out the proposed vehicle operation strategy and a new vehicle operation strategy is calculated. This continues until a stationary state is reached in which no other sudden changes occur. The vehicle operation strategy is determined by means of an energy profile, such as it relates to consumption and time requirement. On the other hand, the energy profile is calculated based on the driver, vehicle, routes and weather data. The route data is loaded from a digital road map with altitude reading or from a GPS. The energy profile of anticipated changes in route or traffic conditions such as traffic jam, is supposed to be updated by means of an RDS-TMC system. No other models were made to implement this. The proposed method is aimed at a motor vehicle and ultimately determining the type of drive by the driver, whereby it is difficult to assess the fuel economy.

SUMMARY

The invention is based on providing a method for controlling a hybrid drive in a rail which meets the framework conditions of this system.

The invention solves the problem by means of a method with the characteristics of the claim 1. The configurations are presented in the subsidiary claim.

The framework conditions when operating a rail vehicle are predetermined by the electronic route timetable, which—as already known—is loaded into the train control device through a radio relay before travelling. In an electronic route timetable, the route-section-related speeds and hence, the time frames between two travel points are also loaded. Thus, the method involves pre-determining the route-section-related types of drive of the rail vehicle before travelling using the electronic route timetable. A deviation of the actual position from a target position of the rail vehicle obtained from the electronic route timetable is then determined while the vehicle is travelling. On the other hand, a time margin is calculated on the basis of the difference in position. The type of drive is then either retained or changed based on the time margin. For instance, if the time margin is negative in terms of delay, it is changed into a type of drive with higher output.

For safety reasons, a test is carried out before activating the type of drive with higher output to find out whether the expected speed varies significantly from the one defined by the electronic route timetable. In the case of significant deviation, the control center must first grant a release, for instance by providing a modified electronic route timetable. The same approach also applies in a case where a type of drive with lower output is to be activated.

To determine the route-section-related types of drive in advance before travelling, a corresponding model is used as predictive observer. The target system variables of the hybrid drive, for instance a target motor output is also determined using this mode. During the vehicle operation, the actual system variables are loaded and a deviation between the actual and target system variables is calculated. Taking the nominal value into consideration, the decision is then made, whether to interfere with the system or whether the model will be repeated using the actual system variables. The output variables of the model is determined for instance using the maximum principle according to Pontrjagin and by using dynamic programming according to Bellman. Another proposed safety measure involves the model being monitored by a safety manager. The safety manager verifies the input variables, the output variable and the internal parameters of the model. Due to the loading state of the electric energy storage device, for instance consisting of several lithium-ion reservoirs (super caps), being safety-sensitive, it is monitored and in the case of unreasonable values, the energy reservoir is upgraded or deactivated completely.

The predictive control process belongs to the class of model-based control methods and allows prediction into the future, the so-called prediction horizon.

The main idea of the invention is the utilization of the electronic route timetable, which in combination with an altitude profile as predictive method, uses the fuel-saving potential to its fullest advantage. This means that the energy input is minimized by means of predictive control. As a result, this reduces the operating costs for the operator. As a matter of course, the model also offers the possibility of registering and storing an individual behavior pattern of the rail vehicle driver. With renewed travelling through the same route with the same rail vehicle driver, it is then possible to go back to his individual behavior pattern.

BRIEF DESCRIPTION OF THE DRAWING

A select model example is shown in the diagrams. It includes.

DETAILED DESCRIPTION

Figure 1:
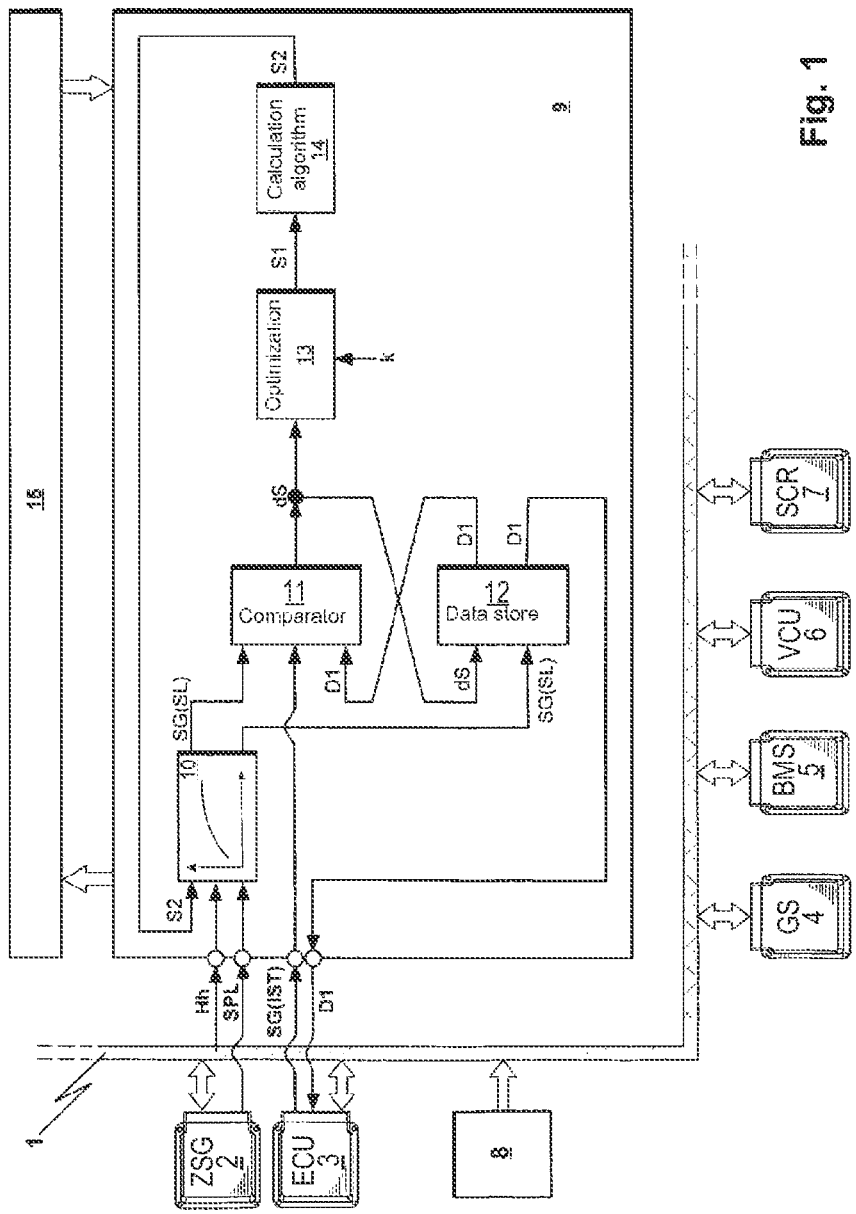
FIG. 1 an information structure as block diagram,
FIG. 2 a program flow chart,
FIG. 3 a first subprogram UP1 and
FIG. 4 a second subprogram UP2.

FIG. 1. shows the information structure of a hybrid drive for a rail vehicle in form of block diagram. A hybrid drive typically includes an internal combustion engine, an electric motor, a gear unit, electric converter and an electric energy reservoir such as a lithium ion reservoir (super caps). A train control device 2 (ZSG), a motor control device 3 (ECU), a gear control device 4 (GS), a battery management control device 5 (BMS), a converter control device 6 (VCU) and as example, control device 7 for regulating exhaust gas (SCR), are connected to a joint electronic data bus 1, such as a CAN bus system or ethernet.

The control devices 2 to 7 connected to data bus 1 are both receivers and transmitters. Also connected to data bus 1 is a unit 8 for receiving train radio relay and the data of the GPS. The electronic route timetable with loaded electronic route map is then deposited onto the data bus by means of the train radio relay. The data of the GPS include the actual position and the current altitude.

The information structure is complemented by a model 9 in form of predictive observer and a safety manager 15. The safety manager 15 monitors the input variables, the output variables and the parameters of the model 9. The input variables of model 9 are the electronic route timetable SPL, the actual system variables SG (IST) and the actual altitude Hh. The electronic route timetable SPL with loaded electronic route map is provided by the rail control device 2. The electronic route timetable SPL contains the route-section related speeds such as, the permissible speed between a travel point A and a travel point B. The time period between the travel points are also defined using the route-section-related speeds. The actual altitude Hh is provided by unit 8 on data bus 1. The actual system variables SG(IST) are provided by motor control device 3 and corresponds in general to the available individual data of all control devices 2 to 7 connected to the data bus 1, including unit 8. This includes for instance, the actual rotational speed of the internal combustion engine, the actual motor output, the actual fuel consumption, the status of the energy reservoir, the actual position of the rail vehicle as well as the oil and the energy reservoir, the coolant and the converter temperature. The output variable of model 9 is signal D1, which is driven on motor control device 3.

Within model 9, a model-based calculation 10, a comparator 11, a data storage device 12, an optimation 13 and a calculation algorithm 14 are arranged as functional units. The open-looped control system 10 is illustrated mathematically in the calculation 10. The input variables of the calculation 10 are the electronic route timetable SPL, the actual altitude Hh and a signal S2. The target system variables SG (GL) are calculated using calculation 10, such as the target position or the target motor output. The target system variables SG(SL) are regulated on comparator 11 and stored simultaneously in data storage device 12. The target system variables SG(SL), the actual system variables SG(IST) and the data stored in data storage device 12, signal D1, are compared with one another by means of the comparator 11. The resulting deviation dS is stored in a data storage device 12 on the one hand and on the other, it is designated as input variable on optimation 13. The deviation dS with respect to costs is evaluated using optimation 13 as a function of weighting factor k that can be specified in advance. If the deviation dS is more than the marginal value, the actual value will be set as output variable, signal S1. The signal values S1 correspond to a function of cost that is determined by means of the maximum principle according to Pontrjagin and also by means of dynamic programming according to Bellman. In the following calculation algorithm 14, signal S1 is evaluated by means of a pre-specified algorithm. The common algorithms that can be used for this purpose are the Levenberg-Marquart methods, the Newton procedures or the Nelder-Meat procedures. The output variables of the calculation algorithm 14 correspond to a control variable method for the predictive horizon analyzed, which are fed back in form of signal S2 to calculation 10. The model-based calculation 10 is repeated until a minimum is found using the feedback path with optimation 13 and calculation algorithm 14. Route-section-related speed as well as the deviation dS and also the target system variables SG(SL) are stored in data storage device 12.

Before travelling, the route-section-related types of drive are calculated in advance using model 9 by means of the electronic route timetable SPL and the altitude profile of the route. The former is loaded based on route section into the data storage device 12, for instance, a solely combustion engine type of drive in a track with ascending slope or a type of drive with recuperation (energy reverse flow) in a track with descending slope. During vehicle operation, motor control device 2 evaluates the current status of the overall system using data D1 and may trigger a change in the type of drive using data bus 1. This will be explained in detail with the example of the position deviation.

The target position is determined by means of calculation 10 as one of the target system sizes SG(SL). The actual position is provided to model 9 as one of the actual system sizes SG(IST) of engine control device 3 as an input value. The comparing system 11 calculates a deviation dS between the actual system size SG(IST) and the target system sizes SG(SL). In this example, the deviation dS therefore corresponds to a position deviation. This is filed in data storage 12 by section of the route. The data values D1 are read in a cyclical manner by engineer control device 2 and evaluated. For this purpose, engine control device 2 calculates a time reserve based on data value D1, which identifies the position deviation. In case of a negative time reserve in the sense of a delay, a switch is made to a type of drive with higher power output. In case of a time reserve within a tolerance range, the type of drive is retained and if there is a positive time reserve in the sense of a premature arrival, a switch is made to a type of drive with the lowest possible energy consumption. If the rail vehicle would reach the next waypoint, for example a station, too late, the engine control device 3 initiates a switch to the combined combustion engine and electric engine. For safety reasons, a check is performed before activation of the types of drive with higher power outputs on whether the expected speed deviates significantly from the sped that is defined by the electronic route schedule. If this is the case, authorization must first be obtained from the control center, for example, the control center may provide a modified electronic route schedule.

Figure 2:
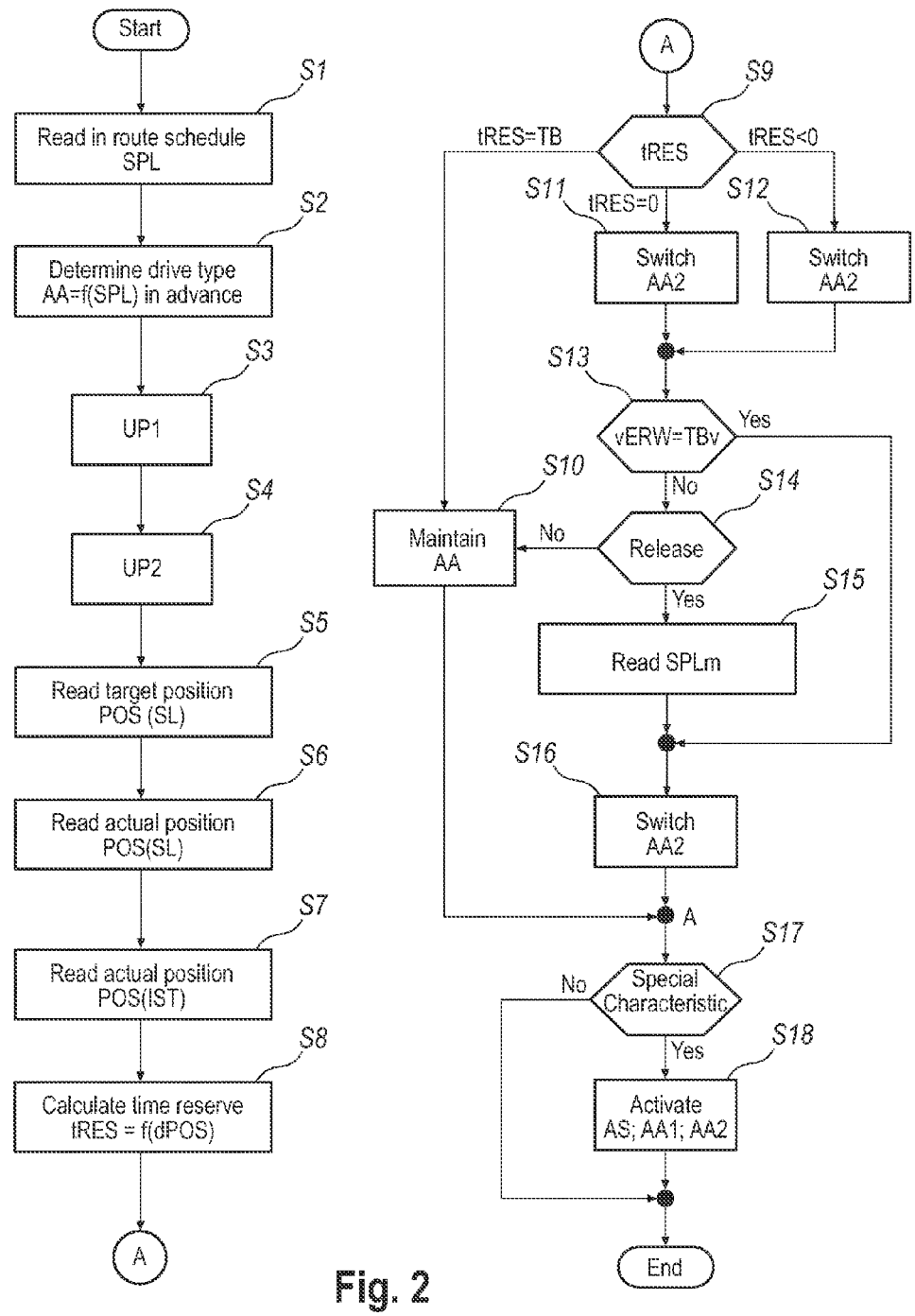

FIG. 2 shows a program flow chart of the process. The program flow chart was based on the example of a position deviation described above.

Figure 3:
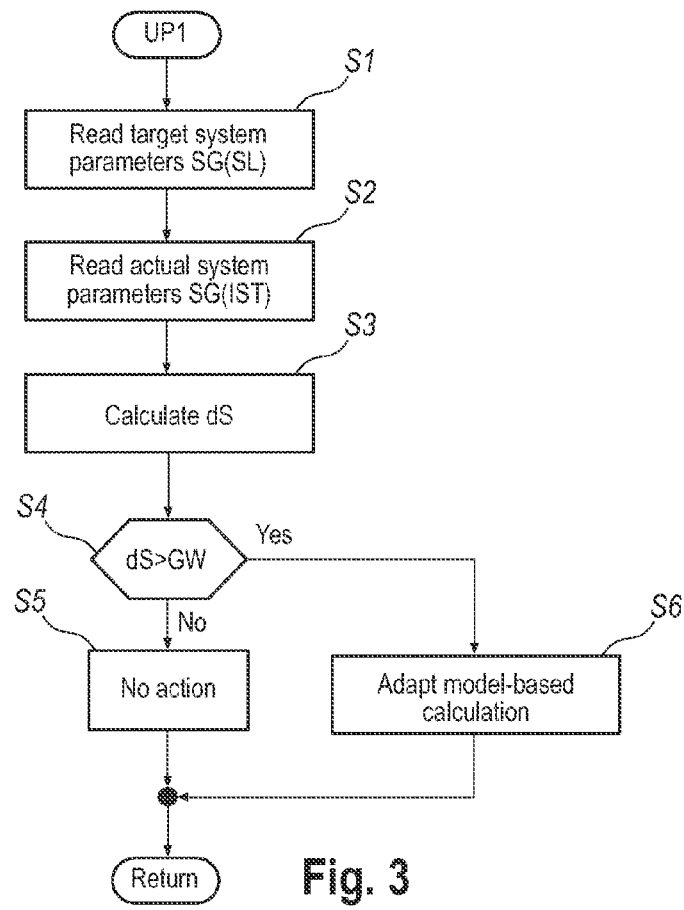

For S1, the electronic route schedule SPL is read with the deposited route map or train directional radio and filed in the train control unit. Before the start of a journey, the types of drive AA based on route sections are determined predicatively for S2 via the model and are saved in the data storage (FIG. 1: 12). In practical driving operation, for S3 branching out to the first subprogram UP1 is performed in order to adjust the model. The first subprogram UP1 is shown in FIG. 3 and is explained in connection with this figure. After return from the first subprogram UP1 branching out into a second subprogram UP2 is performed at S4 for checking the energy storage device.

Figure 4:
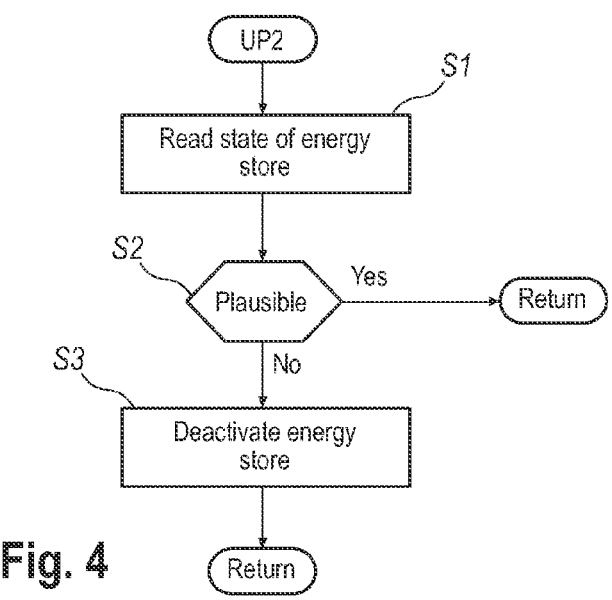

The second subprogram UP2 is shown in FIG. 4 and is explained in connection with this. At S5, the target position POS(SL) of the rail vehicle is calculated via the model-based calculation (FIG. 1: 10) as a target system parameter, and the actual position POS(IST) is read as one of the actual system parameters from the engine control equipment for S6. Then the actual position POS(IST) at S7 is compared with the target position POS(SL), from which a deviation (FIG. 1: dS), a position deviation dPOS here, is determined. The position deviation dPOS is stored in the data storage unit related to the distance section and read cyclical by the engine control equipment. In turn, the engine control equipment calculates a time reserve tRES at S8 from the position deviation dPOS. Then the time reserve tRES is evaluated at S9. If this is within the tolerance range TB (tRES=TB), the current drive type AA is maintained at S10 and the program process flow is continued at point A. If the time reserve tRES lies outside the tolerance band TB and is negative in the sense of a delay (tRES<0), it will be changed at S11 to a drive type AA1 with a higher output and the program for at S13 will be continued. If the time reserve tRES is external to the tolerance range TB and is negative in the sense of a delay (tRES>0), there is a switch to drive type AA2 with the lowest energy consumption at S12 and the program process flow is continued at S13.

If a change of the drive type was calculated at S11 or S12, a check is performed at S13 to determine whether the expected speed vERW is within a permissible range TBv, which is prescribed by the route schedule. If the result is positive (S13: yes), the corresponding drive type is set at S16 and the program process flow is continued at point A. If the result is negative (S13: no), i.e., the expected speed vERW is external to the permissible range TBv, there is a check at S14 to determine whether there is a release at the control center. If this exists (S14: yes), the modified route schedule SPLm is read in at S15, the previously determined drive type is activated at S16, and the program process flow is continued at point A. If the control center does not give a release (S14: no), the current drive type AA remains set, S10, and the program process flow is continued at point A. Following point A, there is a check at S17 to determine whether anything special has occurred. A special feature here is a place where trains must run slowly or a line section with a prescribed drive type, for example, such as electric drive type in a railway station area.

If there is a special feature (S17: yes), the prescribed drive type is set, S18, and the program process flow is ended. If no special feature exists (S17: no), the current drive type remains set and the program process flow is ended.

An initial subprogram UP1 is shown in FIG. 3, in which there is a branch from S3 into the program process plan of FIG. 2. The system parameters are evaluated via the first subprogram UP1, and the model-based calculation (FIG. 1: 10) is trained to calculate the target system parameters. At S1, the target system parameters SG(SL) are determined and read in via the model-based calculation. Then the actual system parameters SG(IST) are read at S2 from the engine control equipment, and the actual system parameters SG(IST) are compared with the target system parameters SG(SL) at S3. The deviation dS derived from this is then compared with a threshold value GW at S4. If the deviation dS is smaller than the threshold value GW (S4: no), nothing is done, S5. This means that the model-based calculation has already been optimized. Then there is a return to S3 in the program process plan of FIG. 2. If it is determined at S4 that the deviation dS is greater than the threshold value GW (S4: yes), the model-based calculation is adapted at S6 (FIG. 1: 13, 14) and there is a return to S3 in the program process plan of FIG. 2.

A second subprogram UP2 is shown in FIG. 4, in which there is a branch from S4 of the program process plan of FIG. 2. The energy store, for example, a lithium-ion storage battery, is checked via the second subprogram UP2. At S1, the status of the energy store is read by the engine control equipment via the data bus. The battery management control unit (BMS) makes the corresponding data of the energy store available on the data bus. Then these are checked for plausibility at S2. If they are plausible (S2: yes), there is a return to S4 in the program process plan of FIG. 2. If the data are not plausible, individual or even all cells of the energy store are deactivated at S3, an error flag is set, and then there is a return to return to S4 in the program process plan of FIG. 2.

REFERENCE DRAWING

1 Data bus
2 Train control equipment (ZSG)
3 Engine control equipment (ECU)
4 Transmission control system (GS)
5 Battery management control unit (BMS)
6 Frequency converter controller (VCU)
7 Control unit for determining emissions (SCR)
8 Unit
9 Model
10 Model-based calculation
11 Comparator
12 Data storage unit
13 Optimization
14 Calculation algorithm
15 Safety management

The invention claimed is:

1. A method to control a hybrid drive in a rail vehicle, comprising:
   predetermining an electronic rail schedule via a train control device as sectionally allocated speeds prior to travel;
   predictively determining sectionally allocated drive types prior to travel via the electronic rail schedule using a model based on the electronic rail schedule, an elevation profile, and environmental conditions;
   predictively determining target system parameters of a hybrid drive type prior to travel via the model based on the electronic rail schedule, an elevation profile, and the environmental conditions;
   calculating a deviation of actual parameters from the target parameters;
   using a control device, deciding based on the deviation whether to train the model via the actual parameters wherein no interference occurs if the deviation of the actual system parameters in reference to the target system parameters is below a threshold, and in case of a deviation exceeding the threshold, the model is adjusted via the actual system parameters;
   during operation, determining a deviating position of an actual position from a target position via the electronic rail schedule;
   calculating a time reserve based upon the deviating position; and
   using the same or a different control device, deciding whether to maintain or change the drive type based at least partially upon the time reserve, wherein if the time reserve is negative, the drive type is changed to another drive type that consumes more energy, if the time reserve is within a tolerance range, the drive type is maintained and if the time reserve is positive, the drive type is changed to another drive type that consumes less energy.

2. A method according to claim 1, wherein changing the drive type occurs upon release by the control center or upon release of a modified electronic rail schedule.

3. A method according to claim 1, wherein the model is adjusted via a predetermined calculation algorithm comprising one or more of a Levenberg-Marquart method, Carleman linearization, and a Nelder-Mead method.

4. A method according to claim 1, further comprising monitoring the model by a safety management.

5. A method according to claim 1, further comprising checking electric energy storage for plausibility using one or more of charge level, temperature, power release and voltage level.

6. A method according to claim 5, wherein plausibility is negative, further comprising gradually or entirely deactivating the electric energy storage.

* * * * *